United States Patent [19]

Koerner et al.

[11] 4,039,605

[45] Aug. 2, 1977

[54] ORGANOSILICON CONTAINING RESIN COMPOSITION AND PROCESS FOR ITS PREPARATION

[75] Inventors: Götz Koerner; Václav Kropác, both of Essen; Hans-Jürgen Patzke, Gelsenkirchen-Resse, all of Germany

[73] Assignee: Th. Goldschmidt AG, Essen, Germany

[21] Appl. No.: 522,621

[22] Filed: Nov. 11, 1974

[30] Foreign Application Priority Data

Nov. 12, 1973 Switzerland ............... 15879/73

[51] Int. Cl.² .............. C08L 67/00; C08L 83/10; C08G 73/10; C08G 77/26
[52] U.S. Cl. .................... 260/824 R; 260/46.5 E
[58] Field of Search ............... 260/46.5 E, 46.5 R, 260/824

[56] References Cited

U.S. PATENT DOCUMENTS 3,384,599  5/1968  Omietanski et al. ............ 260/46.5 R
3,740,305  6/1973  Hoback et al. ................ 260/46.5 E Primary Examiner—Wilbert J. Briggs, Sr.

Attorney, Agent, or Firm—Toren, McGeady and Stanger

[57] ABSTRACT

The disclosed resin composition is the cocondensation product of
a. a polysiloxane having ≡SiOR groups, wherein R is lower alkyl and wherein hydrocarbon groups are linked to the silicon of said groups, at least some of said hydrocarbon groups being phenyl, and
b. an organic ≡COH group containing component which at least partially consists of a diimido compound of the formula

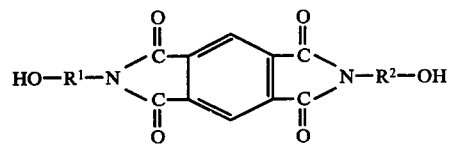

wherein $R^1$ and $R^2$ symbolize alkylene of 2 - 4 carbon atoms.

The inventive resin composition is a superior lacquer capable of withstanding extreme thermal stresses.

The invention also discloses a process for preparing the inventive lacquer composition.

22 Claims, No Drawings

ORGANOSILICON CONTAINING RESIN COMPOSITION AND PROCESS FOR ITS PREPARATION

FIELD OF INVENTION

The invention is directed to organosilicon containing resin compositions and a process for the preparation of such compositions by reaction of polysiloxane resin precursors having SiOR groups, wherein R is lower alkyl, and having hydrocarbon groups linked to the silicon of said groups, said hydrocarbon groups being phenyl groups which may be partially replaced by lower alkyl groups, with an organic COH group containing component, at elevated temperature and in the presence of a solvent and a catalyst.

BACKGROUND INFORMATION AND PRIOR ART

Modification procedures wherein SiOR group containing polysiloxane resin precursors of the indicated kind are reacted with organic COH group containing compounds, are well known and have been described in the chemical literature. Reference is thus had to "Chemie und Technologie der Silicone" by Walter Noll, page 215 ff. and page 262 ff. The purpose of the modification is to produce resin compositions which combine the beneficial characteristics of the initial polysiloxane with those of the organic resins. The siloxane component in the ultimate resin composition causes primarily a marked improvement of the thermal stability and of the weather resistance. Thus, the resistance towards yellowing or other discolorisation and the retention of gloss when subjected to thermal stresses are markedly improved by the modification. The organic resin component, in turn, imparts the modified resin primarily with improved adhesion or bonding characteristics, improved durability and also satisfactory formability. Moreover, the presence of the organic resin component contributes to satisfactory pigment compatibility.

According to the prior art, numerous organic COH group containing resin precursors have been proposed. Particularly suitable are polyesters as they are obtained by reaction of adipic acid, terephthalic acid, isophthalic acid, phthalic acid or their esters — for example, methyl esters — or anhydrides with multivalent alcohols, such as, for example, ethyleneglycol, trimethylolpropane, glycerine, and pentaerythrite. Suitable for the intended purpose are also acrylic resins, epoxy resins, polycarbonates, phenol resins, melamine resins or urea resins with free COH groups. Of particular importance are alkyde resins which contain esters of carboxylic acids containing several unsaturated bonds.

The cocondensation between the organosilicon compound and the organic resin proceeds pursuant to the following reaction scheme:

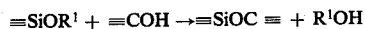

This reaction can be catalyzed by suitable catalysts as, for example, by zirconium acid ester and titanium acid ester. Trifluoro acetic acid is also a suitable catalyst. The reaction may be carried out in the presence of inert solvent. Suitable examples for such solvents are cyclohexanon, xylene and toluene.

The cocondensation is suitably carried out at temperatures above 70° C, preferably in a temperature range between 120° C and 150° C.

SUMMARY OF THE INVENTION

It is a primary object of the invention to provide resin compositions containing organosilicon compounds and being the result of a cocondensation of the kind referred to which have superior characteristics, particularly from a thermal resistance point of view.

Generally, it is an object of the invention to improve on the art of organosilicon containing resin compositions and to expand on their utility and fields of application.

It is also an object of the invention to propose a simple process for preparing the inventive resin compositions.

Briefly, and in accordance with the invention, the inventive resin composition is the cocondensation product of a. a polysiloxane having ≡SiOR groups, wherein R is lower alkyl and wherein hydrocarbon groups are linked to the silicon of said groups, at least some of said hydrocarbon groups being phenyl, and b. an organic ≡COH group containing component which at least partially consists of a diimido compound of the Formula I:

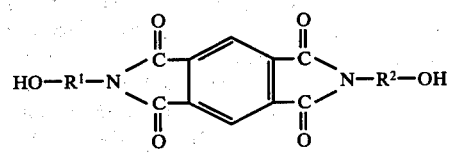

wherein $R^1$ and $R^2$ symbolize alkylene of 2 – 4 carbon atoms.

The crux of the inventive resin composition is thus that the organic COH group containing component consists of or at least comprises compounds of Formula I as defined above.

The inventive resin compositions form excellent lacquer films exhibiting superior thermal stability. The adhesion of such films on various substrates is significantly improved upon thermal aging under extreme conditions as, for example, at temperatures of about 350° C. This is due to the characteristics of the resins to become brittle upon thermal stresses of long duration to a far lesser extent than resin products of the prior art. This beneficial property of the inventive resin compositions opens up fields of application for the resins for which the prior art products could not be used. Due to their enamel-like characteristics, the inventive products are thus particularly suitable as lacquer coatings of devices and structural elements which are subject to extreme thermal stresses. Thus, for example, the resin compositions of this invention may be used for the coating of furnaces and vents and aerators associated with heating devices. Further, they are suitable for forming lacquer coatings on the surfaces of pots and frying pans. Due to the thermal resistance of the resin compositions, they may also be employed for coating of units which are used in space travel and in the rocket and missile technology. Fired lacquer films or coatings produced from the inventive product exhibit very small weight losses upon thermal aging. Furthermore, they possess an extraordinary resistance towards solvents and exhibit low thermal plasticity.

The diimido compounds of Formula I may be prepared in a manner known per se by reacting pyromellitic acid anhydride with alkanolamines of the formula $H_2NR^aOH$, wherein a = 1 or 2, for example,

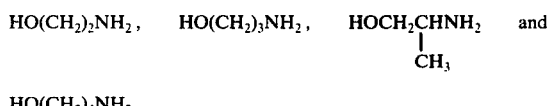

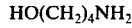

As solvent for the reaction dimethylformamide may be used. The water which is formed in the reaction may be removed by azeotropic distillation under addition of xylene.

The thermally stablest modified resin compositions are obtained if the compound of Formula I is the reaction product of pyromellitic acid dianhydride with ethanolamine. If the ethanolamine is replaced by isopropanolamine-(3), the compounds thus obtained react in the reaction with the siloxanes somewhat slower, permit, however, the preparation of binder solutions of slightly higher concentration.

The properties of the inventive resin compositions may be modified by replacing a portion of the diimido compounds of Formula I by multivalent aliphatic alcohols and/or by saturated polyesters which contain alcoholic hydroxyl groups. In this manner it is possible to influence the gloss of the coatings and also the resistance towards yellowing. In order to reduce the preparation costs and for some fields of application, certain predetermined process technical characteristics may intentionally be less than optimum by using for the organic component not only compounds of Formula I but also aliphatic alcohols and/or polyesters containing OH groups. Thus, the organic component in such cases does not exclusively consist of Formula I compounds but also of the aliphatic alcohols and/or the OH groups containing polyesters.

Examples of suitable multivalent aliphatic alcohols which may make up a portion of the organic component so as to replace compounds of Formula I are glycerine, trimethylolethane, propyleneglycol, trimethylolpropane, pentaerythrite, 1,4-dimethylolcyclohexane, ethyleneglycol or neopentylglycol.

In respect of the saturated polyesters which may be used as part of the organic COH group containing component, it is recommended to use those whose acid component is selected from terephthalic acid, isophthalic acid, phthalic acid or trimellitic acid and wherein as multivalent alcohols the above-mentioned alcohols are used. Preferably, polyesters of ethyleneglycol and terephthalic and/or isophthalic acid are employed. These have the formula

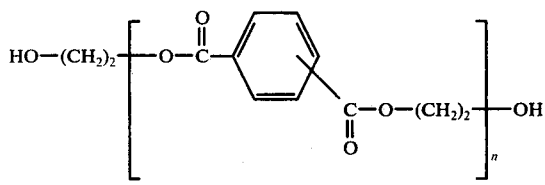

wherein n = 1 through 10, preferably 1.3 to 4.

Pursuant to modification of the invention, up to 85 equivalent-% of the compounds of Formula I are replaced by multivalent aliphatic alcohols or, up to 90 equivalent-% of the compounds of Formula I are replaced by alcoholic hydroxyl group containing saturated polyesters. If mixtures of multivalent aliphatic alcohols and the aforementioned polyesters are used, then 5, to 50 equivalent-% of the compounds of Formula I and 95 to 50 equivalent-% of the above-mentioned mixture may be employed.

The inventive process of preparing the resin compositions is advantageously carried out in the presence of strongly polar solvents, such as, for example, dimethylformamide, dimethylacetamide, tetramethylurea, N-methylpyrrolidon or hexamethylphosphoric acid triamide. Suitable, if less advantageous, are weakly polar solvents, such as, cyclohexanon or ethylglycolacetate.

In respect of the catalysts in whose presence the inventive procedure should be carried out, the prior art catalysts used for the modification processes previously referred to are suitable. Thus, for example, titanicacidester, such as, butyl or isopropyltitanate, are superiorly suitable.

The inventive modification or cocondensation reaction is advantageously carried out within a temperature range of about 100° and 180° C. A preferred temperature is about 140° C. After removal of the solvent and the auxiliary solvent which is necessary for the azeotropic distillation, the reaction product is obtained in almost 100% yield. The removal of the solvent or solvents is suitably achieved by distillation. The reaction product, in spite of the extremely high yield, does surprisingly not gel.

Concerning the polysiloxane resin precursors containing SiOR groups, it is preferred that the R groups are lower alkyl, such as, alkyl of 1 to 4 carbon atoms, preferably methyl. Such polysiloxane resin precursors are known and are disclosed, for example, in German Auslegeschrift No. 2,107,471. Preferred polysiloxane resin precursors are those with a hydrocarbon: silicon ratio of 0.9 to 1.67, preferably of about 1. An example of polysiloxanes suitable for the inventive purposes is represented by the unit formula

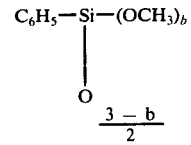

wherein b is about 0.33 to 1.27. In such siloxanes, a portion of the $C_6H_5$ groups may be replaced by methyl, ethyl or propyl. The presence of methyl groups causes a more rapid curing while propyl groups cause an improved compatibility with the organic COH group containing component.

A further example for a suitable polysiloxane resin precursor for the inventive purposes is represented by the following formula:

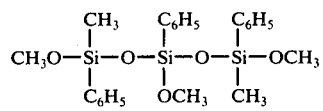

It is preferred if the polysiloxane resin precursor has 0.24 to 0.8 mole of SiOR groups per 100 g.

It is also preferred that the polysiloxane resin precursor is reacted with the organic compound, calculated on reactive groups, in about equimolar ratio and that the ultimate resin composition contains about 30 to 80% by weight of polysiloxane.

The silicon content of the final product can be calculated in simple manner as follows:

Assuming that the OR groups are methoxy groups, the amount of silicon in percent in the product is:

$$\frac{E_{SV} \cdot \% \text{ Sil.V}}{E_{org} + E_{SV}\left[1 - \frac{\% \text{ CH}_3\text{O}_{SV}(31 + 1)}{100 \cdot 31}\right]}$$

wherein $E_{SV}$ = supplied amount of silicone resin precursor
$E_{org}$ = supplied amount of organic component(s)
% $CH_3O_{SV}$ = methoxy content in the silicone resin precursor
% Sil.V = % silicon in the silicone resin precursor = $100 - (\% \text{ CH}_3\text{O}_{SV})[1 - (8/31)]$ The invention will now be described by several Examples, it being understood that these Examples are given by way of illustration and not by way of limitation and that many changes may be effected without affecting in any way the scope and spirit of the invention as recited in the appended claims.

The Examples are directed to the preparation of inventive resin compositions pursuant to the inventive procedure and also deal with the characteristics and properties of the ultimate products.

EXAMPLE 1

300 g of xylene are added to 158.7 g (1.045 equivalents) of N,N'-bishydroxyethylpyromellitic acid diimide. For the purpose of azeotropically drying the diimide, 200 g of xylene were removed by distillation under agitation. Subsequently, 410 g of anhydrous dimethylformamide and 200 g (1.045 equivalents) of a polysiloxane of the formula

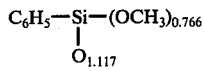

were added. This mixture was heated under agitation to 120° C, which resulted in a clear solution. Subsequently, 0.2 ml of butyltitanate were added and the mixture thus obtained was heated to a temperature of 140° to 145° C. At this temperature, 468 g of distillate were removed by distillation within a time period of 4.5 hours. At the same time, a mixture of 200 g of dimethylformamide and 265 g of dried xylene were added in dropwise manner. The product thus obtained was filtered in order to remove a slight opalescence. A clear resin solution having a solid content of 39.5% was obtained in this manner. After splitting off methanol, the yield amounted to 91%.

EXAMPLE 2

500 g of xylene were added to 72.5 g (0.477 equivalents) of N,N'-bishydroxyethylpyromellitic acid diimide. For the purpose of azeotropic drying of the diimide, 335 g of xylene were removed by distillation and under agitation. Thereafter, 400 g of dimethylformamide, 259.5 g (0.543 equivalents) of a solution of 35% concentration of an isophthalicacidglycolpolyester in dimethylformamide and 174 g (1 equivalent) of a polysiloxane were added. The isophathalicacidglycolpolyester had the formula

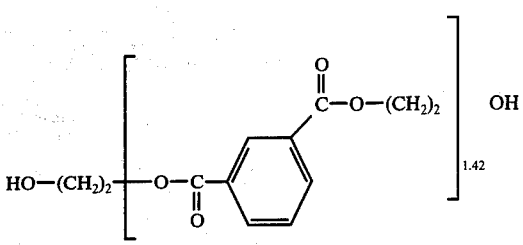

while the polysiloxane had the average formula

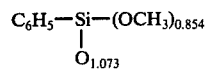

The mixture thus obtained was heated to 120° C which resulted in the formation of a clear solution. 3.5 g of a xylene solution containing 5% of butyltitanate were added thereupon, whereafter, within 1 hour, 564 g of distillate were removed at an interior temperature of 130° to 155° C. The solid content of the resin solution amounted to 59.8%. The yield corresponded to a methanol yield of 90%.

EXAMPLE 3

171 g of xylene were added to 24.9 g (0.164 equivalents) of N,N'-bishydroxyethylpyromellitic acid diimide. For azeotropic drying purposes of the diimide, 114 g of xylene were removed by distillation under agitation. Subsequently, 137 g of dimethylformamide, 34.85 g (0.67 equivalents) of neopentylglycol, 174 g (1 equivalent) of a polysiloxane of the average formula

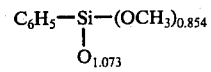

and 89.4 g (0.187 equivalents) of an isophthalicacidglycolpolyester of the composition indicated in Example 2 were added. The mixture thus obtained was heated to 120° C. At this temperature, 3.5 g of a solution of butyltitanate in xylene of 5% concentration was added and subsequently, at an inner temperature of 130° go 155° C, 96 g of distillate were removed within 1 hour. A resin solution of a solid content of 54.9% was obtained. The yield corresponds to a methanol yield of 97%.

EXAMPLE 4

The binder solutions of the Examples 1 through 3 are ground together with titanium dioxide pigment of the rutil type to form a lacquer. The pigment: binder ratio, calculated on the solid content was 2:1. Corresponding to the same formulation, a prior art, commercially available silicone polyester of recognized quality was processed in the same manner. Sand treated steel sheets were coated with these lacquers. The lacquer coats were fired for 2 hours at 230° C. The layer thickness of the fired and cured lacquer films amounted to 30μ. The sheets thus obtained were then aged for 24 hours at 350° C in drying ovens with circulating air. The results which were obtained are tabulated in the following Table:

| Product | Silicone Moiety | Extent of Gloss | Yellowing | Adhesion |
|---|---|---|---|---|
| Silicon Polyester of the Prior Art (Control) | 75 | — | — | Peels off completely |
| Binder of Example 1 | 54 | Dull | Significant (Poor) | Good |
| Binder of Example 2 | 49.5 | Semi-Dull | Clearly Noticeable | Good |
| Binder of Example 3 | 64.8 | Glossy | Very Insignificant (Good) | Good |

The above Table demonstrates that the use of the diimide causes a significant improvement in the adhesion upon stronger thermal stress. The commercially available silicone polyester of the prior art becomes completely brittle upon thermal stress.

EXAMPLE 5

The following Table lists additional modified silicone resins which were obtained according to the procedures disclosed in Examples 1 through 3. All the resin compositions or binders contain the inventive diimido compounds. At the same time, those modified silicone resins were prepared in which the diimido compound in each case, together with the equivalent amount of polysiloxane resin precursor, is eliminated. Lacquer films of both test series indicate in all instances the superiority of those binders which contain the diimido compound upon thermal aging. In all instances, the presence of the diimido compound improves the adhesion of the lacquer films upon thermal aging.

Upon investigating and testing the properties (as in Example 4) it was thus ascertained that the products b, c, d, e, f, g and i (see Table II) yield lacquer films of great stability exhibiting satisfactory gloss retention, resistance to yellowing and adhesion. This also applied after being subjected to a temperature of 300° C for more than 500 hours. The lacquer films consisting of the products a and h remain unchanged even after being subjected to 350° C for 500 hours. An essential advantage as compared to the products of the prior art is the low thermoplasticity. The thermoplasticity was ascertained by measuring the pencil hardness of the fired lacquer films (1 hour at 200° C) in cold condition and at elevated temperature (150° C). The values obtained are represented in Table I:

Table I

| Product | Pencil Hardness At Room Temperature | At 150° C |
|---|---|---|
| a | 2 H | H |
| b | 4 H | 2 H |
| c | 2 H | H |
| d | 4 H | 2–3 H |
| e | 3–4 H | 2 H |
| f | 2 H | HB |
| g | 4 H | 2 H |
| h | 3–4 H | H |
| i | 3 H | H |
| Comparison product (prior art) | 2 H | 2 B |

Table IIa

| Test | Silicone Moiety in % in Total Product | Used Polysiloxane Precursor (in each case 1 equivalent) |
|---|---|---|
| a) | 72.2 | $C_6H_5-Si(OCH_3)_{0.854}O_{1.073}$ |
| b) | 49.1 | as test a) |
| c) | 68.3 | as test a) |
| d) | 30.0 | as test a) |
| e) | 62.5 | $CH_3O-Si(C_6H_5)(CH_3)-O-Si(C_6H_5)(OCH_3)-O-Si(C_6H_5)(CH_3)-OCH_3$ |
| f) | 80.0 | $C_6H_5-Si(OCH_3)_{0.33}O_{1.335}$ |
| g) | 55.9 | $C_6H_5-Si(OCH_3)_{1.27}O_{0.865}$ |
| h) | 58.9 | $C_6H_5-Si(OCH_3)_{0.854}O_{1.073}$ |
| i) | 39.6 | as test h) |

Table IIb

| Test | Polyol[+] | Polyester | Diimido Compound[++] |
|---|---|---|---|
| a) | 85 | — | 15 |
| b) | — | $HO-C_2H_4-[O-CO-C_6H_4-CO-O-C_2H_4-]_{42}OH$ 90 | 10 |
| c) | 75.8 | as test b) 19.2 | 5 |

Table IIb-continued

| Test | Polyol[+] | Modifying agent (in equivalent-% in each case) Polyester | | Diimido Compound[++] |
|---|---|---|---|---|
| d) | — | 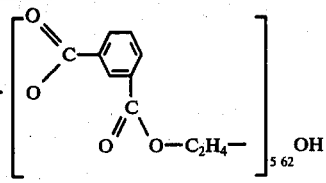 | 50 | 50 |
| e) | 65.7 | as test b) | 18.3 | 16 |
| f) | 49.2 | as test b) | 25.4 | 25,4 |
| g) | 65.7 | as test b) | 18.3 | 16 |
| h) | 25 | 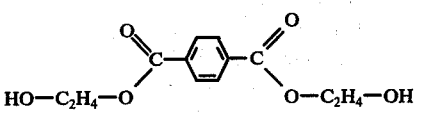 | 50 | 25 |
| i) | 65.7 | 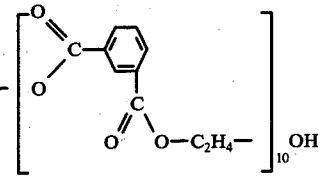 | 18.3 | 16 |

[+]) As polyol a compound of the formula

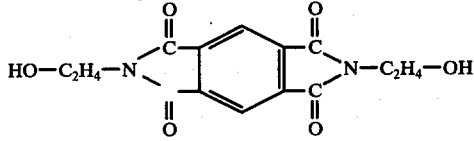

was used
[++]) As diimido compound a compound of the formula

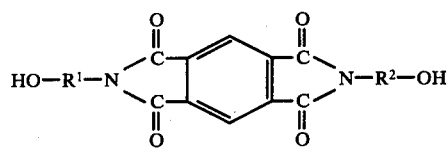

was used.

What is claimed is:

1. A resin composition which is the cocondensation product of
   a. a polysiloxane having ≡SiOR groups, wherein R is lower alkyl and wherein hydrocarbon groups are linked to the silicon of said groups, at least some of said hydrocarbon groups being phenyl having a hydrocarbon to silicon ratio of about 0.9 to 1.67, and
   b. an organic ≡COH group containing component which at least partially consists of a diimido compound of the formula $$\text{HO}-\text{R}^1-\text{N} \begin{array}{c} \text{O} \\ \parallel \\ \text{C} \\ \text{C} \\ \parallel \\ \text{O} \end{array} \begin{array}{c} \text{O} \\ \parallel \\ \text{C} \\ \text{C} \\ \parallel \\ \text{O} \end{array} \text{N}-\text{R}^2-\text{OH}$$

wherein $R^1$ and $R^2$ symbolize alkylene of 2 - 4 carbon atoms.

2. A resin composition as claimed in claim 1, wherein R of (a) is methyl.

3. A resin composition as claimed in claim 1, wherein said hydrocarbon groups of (a) are all phenyl.

4. A resin composition as claimed in claim 1, wherein said hydrocarbon groups of (a) consist of phenyl and lower alkyl.

5. A resin composition as claimed in claim 4, wherein said lower alkyl is methyl.

6. A resin composition as claimed in claim 1, wherein $R^1$ and $R_2$ of (b) symbolize $-CH_2CH_2-$.

7. A resin composition as claimed in claim 1, wherein said component (b) consists of said diimido compound and up to 85 equivalent-%, calculated on said diimido compound, of a polyhydric aliphatic alcohol.

8. A resin composition as claimed in claim 1, wherein said component (b) consists of said diimido compound and up to 90 equivalent-%, calculated on said diimido compound, of saturated polyester comprising alcoholic hydroxyl groups.

9. A resin composition as claimed in claim 1, wherein said component (b) consists of about 5 to 50 equivalent-% of said diimido compound and about 95 to 50 equivalent-% of a mixture of polyhydric aliphatic alcohol and saturated polyester comprising alcoholic hydroxyl groups.

10. A resin composition as claimed in claim 1, wherein said ratio is about 1.

11. A resin composition as claimed in claim 1, wherein said polysiloxane (a) comprises about 0.24 to 0.8 mole of ≡SiOR groups per 100 grams.

12. A resin composition as claimed in claim 1, wherein, calculated on reactive groups, the ratio of (a): (b) is approximately equimolar.

13. A resin composition as claimed in claim 1, wherein the composition comprises about 30 to 80 percent by weight of (a).

14. A resin composition as claimed in claim 7, wherein said polyhydric aliphatic alcohol is glycerine, trimethylolethane, propyleneglycol, trimethylolpropane, pentaerythrite, 1,4-dimethylolcyclohexane, ethyleneglycol or neopentylglycol.

15. A resin composition as claimed in claim 8, wherein said saturated polyester comprising alcoholic hydroxyl groups has an acid component which is derived from terephthalic acid, isophthalic acid, phthalic acid or trimellitic acid.

16. A resin composition as claimed in claim 8, wherein said saturated polyester comprising alcoholic hydroxyl groups has the formula

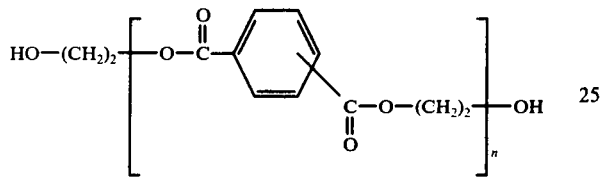

wherein $n = 1 - 10$.

17. A resin composition as claimed in claim 1, wherein said polysiloxane (a) has the unit formula

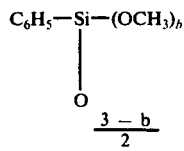

wherein $b$ is about 0.33 to 1.27.

18. A resin composition as claimed in claim 17, wherein a portion of the $C_6H_5$-group is replaced by methyl, ethyl or propyl.

19. A resin composition as claimed in claim 1, wherein said polysiloxane (a) has the unit formula

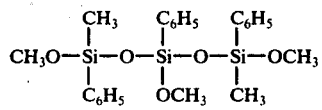

20. In a process of producing resins containing organosilicon compounds by reaction of
   a. polysiloxane resin precursors having $\equiv$SiOR groups, wherein R is lower alkyl, and having hydrocarbon groups linked to the silicon of said groups, said hydrocarbon groups being phenyl groups which may be partially replaced by lower alkyl groups, with
   b. an organic $\equiv$COH group containing component, at elevated temperature and in the presence of a solvent and a catalyst, the improvement which comprises that component (b) at least partially consists of a compound of the formula

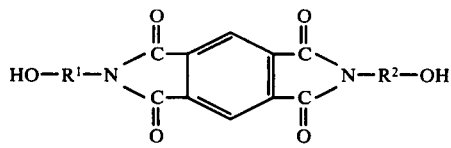

wherein $R^1$ and $R^2$ symbolize alkylene of 2 - 4 carbon atoms.

21. The improvement of claim 20, wherein the reaction is carried out in a strongly polar solvent and at temperatures between about 100° - 180° C.

22. The improvement of claim 21, wherein the catalyst is a titanic acid ester.

* * * * *